United States Patent [19]
Guida

[11] 3,837,100
[45] Sept. 24, 1974

[54] FOOD-HANDLING GUIDES FOR REFRIGERATORS AND FREEZERS

[76] Inventor: Michael F. Guida, 5100 N. Leonard Dr., Norridge, Ill. 60656

[22] Filed: Feb. 9, 1973

[21] Appl. No.: 330,982

[52] U.S. Cl. .................................................. 40/2
[51] Int. Cl. ............................................ A44c 3/00
[58] Field of Search ............... 283/1 A; 35/7 R, 7 A; 40/2, 125, 19.5; 312/116, 234.1, 234.2, 234.4

[56] References Cited
UNITED STATES PATENTS

| 228,204 | 6/1880 | Lemon | 283/1 A X |
|---|---|---|---|
| 1,827,449 | 10/1931 | Wood et al. | 40/2 R X |
| 3,421,239 | 1/1969 | Smith | 35/7 R X |
| 3,460,281 | 8/1969 | Levy | 35/7 R X |

OTHER PUBLICATIONS

"The Evening Star" Washington, D.C., Thursday Nov. 18, 1971 Hints from Heloise in the comic section.

*Primary Examiner*—Joseph S. Reich
*Assistant Examiner*—Wenceslao J. Contreras

[57] ABSTRACT

A chart for identifying enclosed food items deposited in a refrigerator or freezer. The chart is attachable on the front or side of the refrigerator, and has a row of numbers denoting corresponding food items. Pressure-adhesive tabs bearing the numbers are applied to the food containers when the food items are deposited. The tabs are of a pale color for foods which may remain, but of a warning color — such as red — for foods which are perishable and should be removed soon. The chart has index legends — such as letters of the alphabet — to indicate the refrigerator shelves on which the numbered food items have been placed; and lettered self-adhesive tabs are applied in the regrigerator entrance in upward alphabetical order identifying the shelves. The chart also has a column for entering related index legends of the number of servings obtainable from the food items, and a column for the dates on which they are deposited. All entries on the chart are made with a pen containing a water-soluble ink which is non-toxic, and may be erased with a moist swab; and a receptacle is mounted on the chart for keeping tabs and ink pens handy.

3 Claims, 4 Drawing Figures

PATENTED SEP 24 1974　　3,837,100
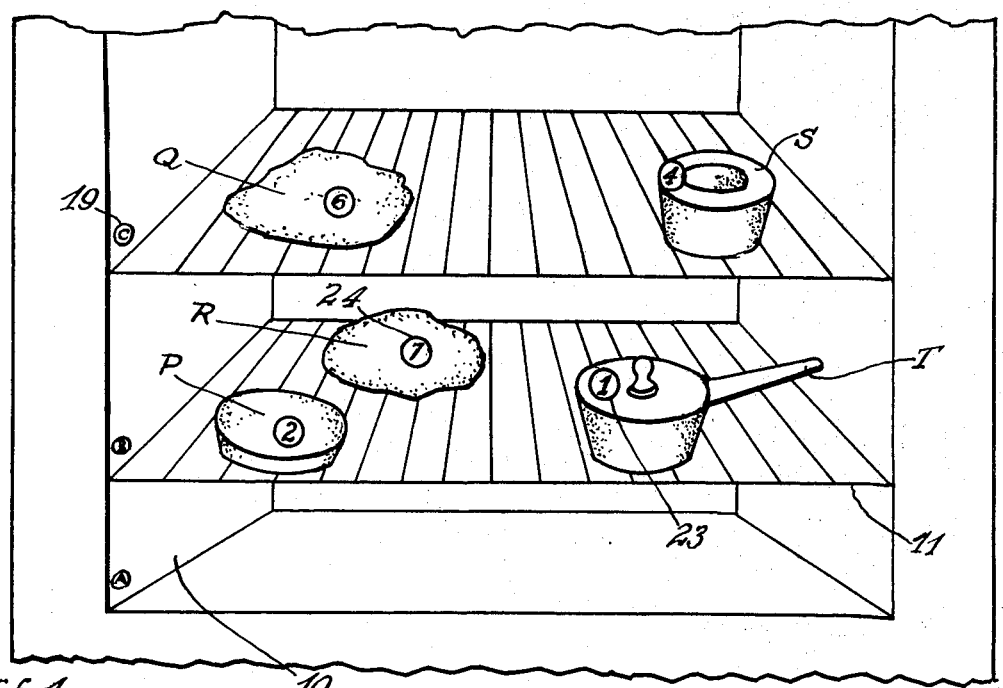
Fig. 1.
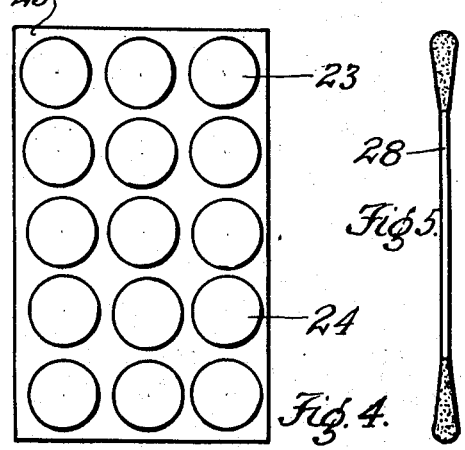
Fig. 2.
| SHELF | | | SERVE | DAY |
|---|---|---|---|---|
| 1 | A | Beef Stew | 3 | Mon. 9 |
| 2 | B | Meat gravy | 2 | Wed. 11 |
| 3 | | | | |
| 4 | B | Canned Peaches | 2 | Tue. 10 |
| 5 | | | | |
| 6 | A | Baked ham | 1 | Thu. 12 |
| 7 | B | Fried liver | 3 | Tue. 10 |
| 8 | | | | |
| 9 | | | | |
| 10 | | | | |
| LUNCH MEAT | Ham-Liver-Saus.-Barb.beef |
| CHEESE | Swiss-Blue-Cheddar-Munster |
| VEGETABLES | Lettuce-Celery-Spinach |
FREEZER
| | SHELF | AMT. | | | |
|---|---|---|---|---|---|
| 1 | E | 2 lbs. | Hamburger | 12-2 | 18 |
| 2 | C | 3 | Fried Chicken | 11-14 | 19 |
| 3 | A | 4 lbs. | Rib Roast | 12-6 | 20 |
| 4 | G | 8 | Lamb Chops | 11-8 | 21 |
Fig. 3.
Fig. 4.
Fig. 5.

FOOD-HANDLING GUIDES FOR REFRIGERATORS AND FREEZERS

This invention relates to foods stored in home refrigerators and freezers, and more particularly to the identification and selection of foods. Usually, foods deposited in refrigerators are contained in vessels or jars or wrapped in aluminum foil, wax paper or plastic sheeting which is translucent or clear. Often this applies to left-overs which are desired saved for later use singly or in addition to other foods to make up a snack or meal. When such a food package has been deposited in a refrigerator, and a day or two passes, its presence or the identity of its contents may be forgotten; and it is usually hard to recognize or identify foods in unmarked containers of the types mentioned, as even clear plastic becomes dull from moisture given off by food contents.

Therefore, foods may remain in a refrigerator unnoticed by the housewife and become spoiled when of a perishable nature. Further, attempts to locate stored foods involve the frequent opening of the refrigerator door and searching time, causing warm air from the premises to enter the refrigerator and lower its chilling efficiency by requiring the motor to run more frequently, so that the operating cost of the refrigerator and the wear of its mechanism are increased. Thus, the difficulty of ascertaining the presence and nature of stored foods makes for waste in those which remain stored when they should be used while fresh, and in overlooking foods which are apt to become spoiled. This kind of waste also applies to foods in a freezer where a large number of food packages may be stored in wrappers covered with frost, making identification of their contents very difficult.

In view of the above conditions, the present invention has for its main object to provide an indexing facility on the outside of the refrigerator and related identification of the food packages inside the same, whereby to locate and identify any food on the index when the refrigerator is opened and facilitate the selection of any desired package without delay, searching or keeping the refrigerator door open.

A further object is to designate foods which are more perishable than others, note the date of their deposit on the index, and make their nature and presence instantly visible when the refrigerator door is opened.

Another object is to provide an external index chart which is attachable to the door or on an outside wall of the refrigerator at a height easily accessible, for making entries of foods that are stored, their quantity and the time when they are deposited.

A still further object is, where the shelves in the refrigerator are many in number or in odd locations, to provide a system of tabs alongside the shelves and corresponding with letters on the index for easily determining the location of any desired shelf.

A final object is to provide a food-handling guide which is so simple that it may be learned easily and used by the average person for the efficient and economical storage and use of refrigerated foods.

A better understanding of the invention may be gained by reference to the accompanying drawing, in which FIG. 1 is a perspective view of the interior of a typical home refrigerator, showing food packages stored according to the present invention;

FIG. 2 is an elevation of a chart presenting an index of the foods in the refrigerator and the conditions of their deposit or removal;

FIG. 3 is a similar partial view of a chart usable for a home freezer;

FIG. 4 shows a paper of tabs used in connection with the stored foods; and

FIG. 5 is an elevation of a swab for removing index entries.

Referring specifically to the drawing, 10 denotes the food compartment of a conventional home-type refrigerator, and 11 the shelves mounted in the same. A variety of foods is shown stored on the shelves, such as a bowl P of meat gravy, a package Q of baked ham, a package R of left-over fried liver, a can S containing a remainder of peach dessert, and a pot T containing left-over beef stew. According to the present invention the identity and conditions pertaining to these foods are entered on the index chart 15 before the foods are deposited in the refrigerator. For this purpose the chart is printed with horizontal lines defining a series of rows 16 which occur in vertical order. The chart is also permanently printed with vertical lines into divisions spaced-off from left to right. Thus, the division 17 has a scale of permanently printed numbers progressing downwardly from 1 to 10; and these numbers are used to identify the foods deposited in the refrigerator. The next division 18 is headed by the title "SHELF" and indicates the shelves on which the foods identified by the numbers are placed. In this connection, where a small refrigerator has only two or three shelves, it is simple to assume the bottom shelf as the first, the next shelf above as the second, etc. However, where a larger number of shelves are contained — some wide, others narrow — a convenient lettering of the same is preferable; and FIG. 1 shows a refrigerator wall adjacent to the shelves equipped with a series of white tabs 19 inscribed with letters in alphabetical order according to the height of the shelves, making it easy to locate any shelf indicated by a corresponding letter in division 18 of the index chart.

When a food is to be named on the chart opposite a chosen number in division 17, the space in the particular row 16 must be open or blank. The entry of the food is then written in that space as seen in FIG. 1. Before the food is deposited in the refrigerator it is also possible to indicate on the chart the number of servings the particular food package will yield. Thus, the chart has a division 20 at the right bearing the title "SERVE" where entries of the servings are made as shown. The chart also has a final division 21 at the extreme right for entering the day and date when each food item is deposited in the refrigerator.

The chart has an additional facility for indicating the presence and categories of essential foods. Such categories usually embrace lunch meat, cheese and vegetables; and rows 22 with these titles are provided at the bottom of the chart. The items in each category are inscribed before the foods are deposited in the refrigerator; and when a removed item is used up its name is erased from the entries in the corresponding row and entered on the shopping list. Therefore, the housewife can easily maintain a supply of essential foods.

The index chart establishes relation with the food packages or containers stored in the refrigerator by means of a system of paper tabs. Like the tabs 19, these are circular discs 23 and 24 which are pressure-adhesive and available in most stores in sets mounted on a backing sheet 25, as seen in FIG. 4. The tabs are obtainable in a variety of colors, but for the present purpose they come in two series, one—23—tinted in light yellow, and the other—24—tinted in light red. When a food item and information pertaining to it have been entered on the chart, its number — chosen on division 17 — is inscribed in large or bold form on a tab. If the food will keep in good condition for several days, the entry of the same number will be made on a yellow tab 23. However, in case the particular food item is perishable, the number will be inscribed on a red tab 24. The proper tab is then pressed down on top of the food package or container, so that on a subsequent opening of the refrigerator the housewife will be able to tell at a glance — and without searching among the packages — which foods can be allowed to remain in the refrigerator and which must be removed and used sooner. Top labeling of the packages is employed because the view of the refrigerator contents is from above when the door is opened.

The index chart is preferably made of cardboard with a pressure-adhesive back or with magnetic back portions for simple application to the door or a side wall of the refrigerator. Or, the chart may be made with a hole 26 at the top for hanging on a convenient wall hook adjacent to the refrigerator or a magnet-based hook attachable to the door or a side wall of the refrigerator. The chart is coated on the frontal side with a plastic film which takes ink from a color pen, available on the market, to inscribe entries on the chart; and the ink is non-toxic or harmless in case children should contact or rub the entries. Preferably, the pen and a supply of tab sheets could be kept in a handy receptacle 27 carried by the chart, the pen also being usable for writing the proper letters on the shelf-indicating tabs and the tabs 23 and 24.

When a food item has been removed from the refrigerator and is not to be returned, the entries on the chart opposite the corresponding identification number in division 17 are removed. This is done by wiping off with a moist swab 28 shown in FIG. 5. Swabs of this kind are readily found in grocery or drug stores, and a few would be kept in the receptacle where the tab papers and marking pen have been deposited. Since the marking ink is also water-soluble, the swab would dissolve and remove the ink entries completely, leaving the particular row on the chart clear for a new entry.

The chart partly shown in FIG. 3 and similar to the one described above will serve for a freezer, which usually has a large food capacity and where food packages are covered with frost and even harder to identify, often involving laborious searching to locate a desired food package. A chart with a longer scale of index numbers will be adequate for freezer use. The tabs could be readily applied to food packages before they are deposited in the freezer, and will show the numbers when the freezer is opened for finding the desired food package.

It will now be apparent that the present invention provides a facility which simplifies the maintenance and availability of foods stored in a refrigerator, rendering their maintenance economical by drawing attention on the chart to foods whose presence in the refrigerator has been forgotten or overlooked, or to foods which are of a perishable nature and should be used sooner than others. Further, the invention greatly reduces the need of opening the refrigerator to see what foods are contained therein or to search for a desired food item, since the chart reveals handy information about the identity of foods contained in the refrigerator. The chart also shows when each food item has been deposited in the refrigerator, enabling the housewife to decide whether the food should remain under refrigeration or be removed. In this respect, where the same perishable food item has been bought twice, the prior use of the one bought later can be avoided by marking the one bought first with a red tab 24 as a notice that it should be used first. Further, the chart tells the number of servings expected from a desired food item, enabling the housewife to decide whether the item is adequate for the immediate need. Finally, the record-keeping feature of the invention provides an integrated and visual color index of the sequence in which foods are to be consumed, discarded or replenished, enabling the housewife to maintain and refrigerate foods efficiently, safely and economically.

I claim:

1. An identifying guide for enclosed food items deposited in the chill and freezer compartments of a refrigerator comprising a chart for entering identifying information about each food item, means to permanently designate each section of said refrigerator in collation with said chart and means to identify each food item in collation with said chart and simultaneously indicate its perishability, said chart comprising a plurality of horizontally positioned and spaced lines on the chart face to enter information on each food item, a plurality of vertical lines spaced across said horizontal lines to establish a series of columns for entering, respectively on each horizontal line, the numerical identification of the food item to be deposited in said refrigerator, the designated section within the refrigerator where the food item is to be placed, the written identification of the food item, the quantity of said food item and the date of deposit in the designated section of said refrigerator, said chart further having a glossy plastic surface suitable for receiving each of said entries in an ink which is non-toxic and water-soluble for deletion of an entry when the food item is withdrawn from the refrigerator, the said chart also having means to mount said chart on the exterior surface of said refrigerator.

2. The identifying guide according to claim 1 wherein said food identifying means comprises a colored tab to be affixed to said enclosed food item, said tab having a surface to receive a number corresponding to the numerical identification of said food item on said chart, said tab being of a red color to indicate early perishability of said food item and of a pale color to indicate a delayed perishability of said food item.

3. The identifying guide according to claim 1, including a pocket affixed to the upper part of said chart to hold a plurality of said food identifying means.

* * * * *